US011734462B2

(12) United States Patent
Gaddam et al.

(10) Patent No.: US 11,734,462 B2
(45) Date of Patent: Aug. 22, 2023

(54) PREVENTING SENSITIVE INFORMATION FROM BEING SCREEN SHARED WITH UNTRUSTED USERS

(71) Applicant: Optum, Inc., Minnetonka, MN (US)

(72) Inventors: Ramprasad Anandam Gaddam, Mumbai (IN); Gregory J. Boss, Saginaw, MI (US); Jon Kevin Muse, Thompsons Station, TN (US); Kristine Xu, Stoneham, MA (US)

(73) Assignee: OPTUM, INC., Minnetonka, MN (US)

( * ) Notice: Subject to any disclaimer, the term of this patent is extended or adjusted under 35 U.S.C. 154(b) by 52 days.

(21) Appl. No.: 17/404,611

(22) Filed: Aug. 17, 2021

(65) Prior Publication Data

US 2023/0055595 A1 Feb. 23, 2023

(51) Int. Cl.
*G06F 21/84* (2013.01)
*H04L 51/212* (2022.01)

(52) U.S. Cl.
CPC ............ *G06F 21/84* (2013.01); *H04L 51/212* (2022.05)

(58) Field of Classification Search
CPC ............................... G06F 21/84; H04L 51/212
USPC ......................................................... 726/26
See application file for complete search history.

(56) References Cited

U.S. PATENT DOCUMENTS

| 9,525,692 | B2 | 12/2016 | Gaudet et al. |
| 9,699,271 | B2 | 7/2017 | Brander et al. |
| 10,140,274 | B2 | 11/2018 | Bastide et al. |
| 10,770,035 | B2 | 9/2020 | Giusti et al. |
| 2013/0166658 | A1 | 6/2013 | Yin |
| 2014/0215356 | A1* | 7/2014 | Brander .................. G06F 21/84 715/753 |
| 2015/0378995 | A1 | 12/2015 | Brown et al. |
| 2016/0188387 | A1 | 6/2016 | Yang |

(Continued)

OTHER PUBLICATIONS

"Engage your audience with presenter modes," accessed on Jan. 18, 2022 from https://support.microsoft.com/en-us/office/engage-your-audience-with-presenter-modes-a3599bcb-bb35-4e9c-8dbb-72775eb91e04, 5 pp.

(Continued)

*Primary Examiner* — Tu T Nguyen
(74) *Attorney, Agent, or Firm* — Shumaker & Sieffert, P.A.

(57) ABSTRACT

An example method comprises determining, by a computing system, that a message-sending computing device has received an indication of user input indicating an intent to send a message to a user of a message-recipient computing device; prior to the message being delivered to the message-recipient computing device, calculating, by the computing system, a screen sharing risk score (SSRS) that indicates a risk that the message-recipient computing device is currently sharing screen content of a screen of the message-recipient computing device with a screen-recipient computing device associated with an untrusted screen-recipient user; and based on the SSRS indicating that the risk is above a risk threshold, causing the message-sending computing device to output an alert indicating that the message-recipient computing device is possibly sharing the screen content of the message-recipient computing device with the screen-recipient computing device associated with the untrusted screen-recipient user.

20 Claims, 6 Drawing Sheets

(56) References Cited

U.S. PATENT DOCUMENTS

2018/0359207 A1    12/2018    Chatterjee et al.
2022/0247588 A1*    8/2022    Ittelson .............. H04L 12/1822

OTHER PUBLICATIONS

Krishnamurthy et al., "On the leakage of personally identifiable information via online social networks," Proceedings of the 2nd ACM workshop on Online Social Networks, Aug. 17, 2009, pp. 7-12.

Tian et al., "All your screens are belong to us: Attacks exploiting the HTML5 screen sharing API," IEEE Symposium or Security and Privacy, May 18, 2014, pp. 34-48.

* cited by examiner

PREVENTING SENSITIVE INFORMATION FROM BEING SCREEN SHARED WITH UNTRUSTED USERS

BACKGROUND

Screen sharing has become a ubiquitous part of modern work. When a user (i.e., a screen-sharing user) shares their screen, all or part of the screen-sharing user's screen content is displayed to one or more other users (i.e., screen-recipient users). However, sensitive information appearing on the screen of the screen-sharing user may inadvertently be displayed to the screen-recipient users. For instance, if a notification regarding an incoming email message contains sensitive information arrives while the screen-sharing user is sharing their screen, the notification may inadvertently be displayed to the screen-recipient users. Examples of sensitive information may include health information, financial information, personal information, legal information, and so on.

SUMMARY

The present disclosure describes devices, systems, and methods for protecting sensitive information from being displayed to screen-recipient users. Prior systems for protecting sensitive information have focused on obscuring sensitive information received by a computing device associated with a screen-sharing user (i.e., a screen-sharing computing device) or suppressing notifications generated by a screen-sharing computing device when the screen-sharing computing device receives a message. Such prior art systems place the burden of preventing disclosure of the sensitive information on the screen-sharing computing device. In other words, it is up to the screen-sharing computing device to prevent disclosure of the sensitive information when the screen-sharing computing device receives a message containing the sensitive information.

Leaving it up to the screen-sharing/message-recipient computing device to prevent disclosure of the sensitive information when the screen-sharing/message-recipient computing device receives a message containing the sensitive information may present several technical problems. For example, leaving it up to the screen-sharing/message-recipient computing device to prevent disclosure of the sensitive information may impose computational burdens on the screen-sharing/message-recipient computing device during a time when the computational resources of the screen-sharing/message-recipient computing device may be taxed by performing screen sharing, which is often accompanied by video conferencing. In another example, leaving it up to screen-sharing/message-recipient computing devices to prevent disclosure of the sensitive information when screen-sharing/message-recipient computing devices receive messages containing the sensitive information may result in unnecessary consumption of network bandwidth because messages may be sent to screen-sharing/message-recipient computing devices when message-sending users may not want to send the messages at all if the sensitive information may be shared with screen-recipient users. That is, although the screen-sharing/message-receipting computing device may properly prevent disclosure of sensitive information, the sensitive information is still sent unnecessarily, resulting in waste of bandwidth.

As described herein, prior to a message being delivered to a message-recipient computing device, a computing system calculates a screen sharing risk score (SSRS). The SSRS indicates a risk that the message-recipient computing device is currently sharing screen content of a screen of the message-recipient computing device with a screen-recipient computing device associated with an untrusted screen-content recipient. In other words, the SSRS indicates a risk that the message-recipient computing device is currently screen-sharing with a computing device used by a user with whom the messaging-sending user does not want to share the message. Based on the SSRS indicating that the risk is above a risk threshold, the computing system may cause a message-sending computing device to output an alert to the user of the message-sending computing device indicating that the message-recipient computing device may currently be sharing screen content with a screen-recipient computing device associated with an untrusted screen-recipient user. Accordingly, the user of the message-sending computing device may elect not to send the message at the current time, or the message-sending computing device may determine that the message is not to be sent at the current time without user intervention or after user confirmation.

Calculating the SSRS and outputting the alert prior to the message being delivered to the screen-sharing/message-recipient computing device may address the technical problems associated with leaving it up to the screen-sharing/message recipient computing device to prevent disclosure of the sensitive information. For instance, the example techniques described in this disclosure may reduce the processing requirements of the screen-sharing/message-recipient computing device, and potentially reduce the amount of information that needs to be sent promoting bandwidth efficiencies.

In one example, this disclosure describes a method comprising: determining, by one or more processors of a computing system, that a message-sending computing device has received an indication of user input indicating an intent to send a message to a user of a message-recipient computing device; and prior to the message being delivered to the message-recipient computing device: calculating, by the one or more processors, a screen sharing risk score (SSRS) that indicates a risk that the message-recipient computing device is currently sharing screen content of a screen of the message-recipient computing device with a screen-recipient computing device associated with an untrusted screen-recipient user; determining, by the one or more processors, whether the SSRS indicates that the risk is above a risk threshold; and based on the SSRS indicating that the risk is above the risk threshold, causing, by the one or more processors, the message-sending computing device to output an alert indicating that the message-recipient computing device is possibly currently sharing the screen content of the message-recipient computing device with the screen-recipient computing device associated with the untrusted screen-recipient user.

In another example, this disclosure describes a computing system comprising: one or more storage devices configured to store score basis data; and one or more processors implemented in circuitry, the one or more processors configured to: determine that a message-sending computing device has received an indication of user input indicating an intent to send a message to a user of a message-recipient computing device; prior to the message being delivered to the message-recipient computing device, calculate, based on the score basis data, a screen sharing risk score (SSRS) that indicates a risk that the message-recipient computing device is currently sharing screen content of a screen of the message-recipient computing device with a screen-recipient computing device associated with an untrusted screen-recipient user; determine whether the SSRS indicates that the risk is above a risk threshold; and based on the SSRS indicating that the risk is above the risk threshold, cause the message-sending computing device to output an alert indicating that the message-recipient computing device is possibly currently sharing the screen content of the message-recipient computing device with the screen-recipient computing device associated with the untrusted screen-recipient user.

In another example, this disclosure describes a computer-readable storage medium comprising instructions that, when executed, cause processing circuitry of a computing system to: determine that a message-sending computing device has received an indication of user input indicating an intent to send a message to a user of a message-recipient computing device; prior to the message being delivered to the message-recipient computing device, calculate a screen sharing risk score (SSRS) that indicates a risk that the message-recipient computing device is currently sharing screen content of a screen of the message-recipient computing device with a screen-recipient computing device associated with an untrusted screen-recipient user; determine whether the SSRS indicates that the risk is above a risk threshold; and based on the SSRS indicating that the risk is above the risk threshold, cause the message-sending computing device to output an alert indicating that the message-recipient computing device is possible currently sharing the screen content of the message-recipient computing device with the screen-recipient computing device associated with the untrusted screen-recipient user.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
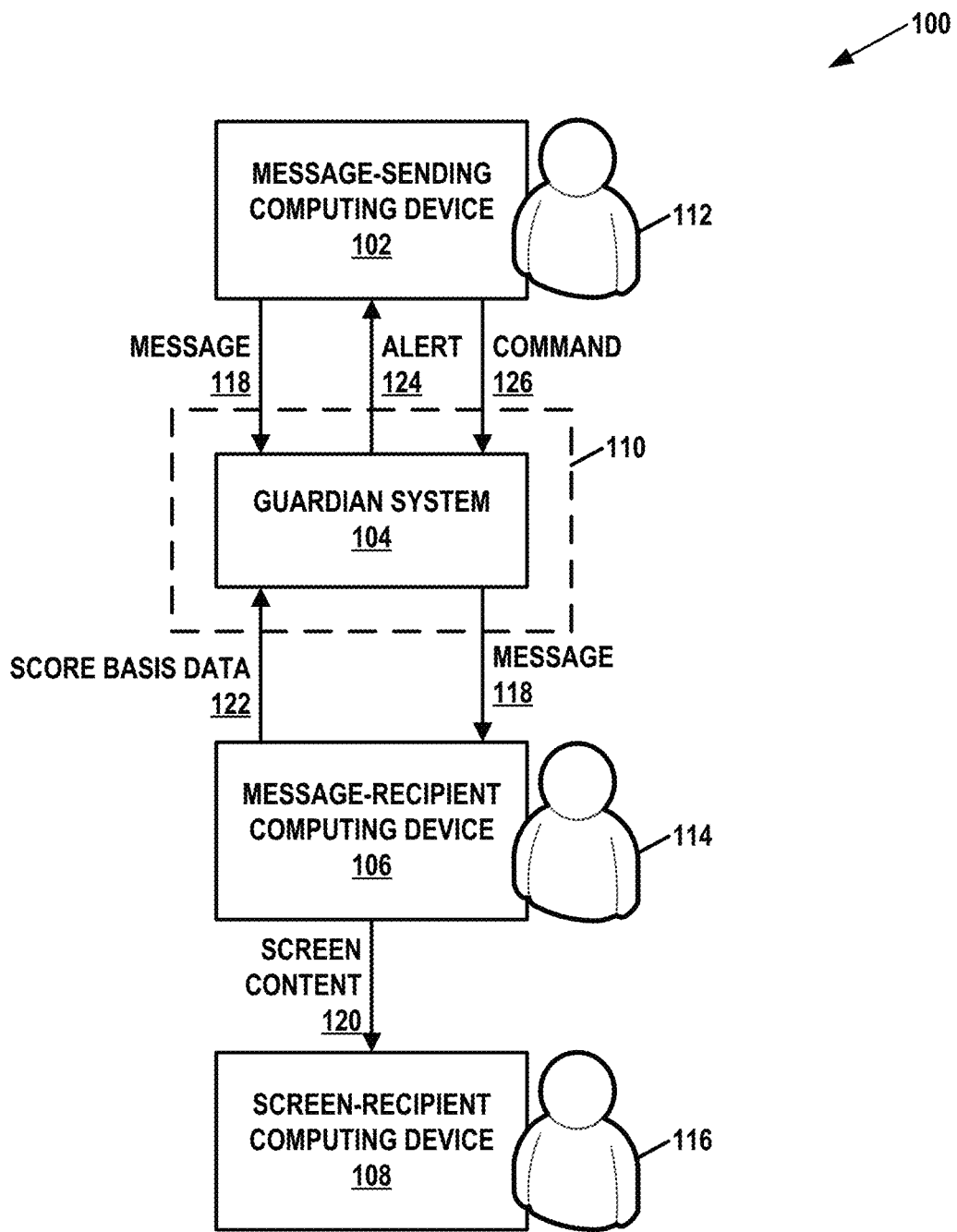
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes a message-sending computing device 102, a guardian system 104, a message-recipient computing device 106, and a screen-recipient computing device 108. Guardian system 104 may be implemented by a separate computing system 110, by message-sending computing device 102, or another computing device or system. A message-sending user 112 uses message-sending computing device 102. A message-recipient user 114 uses message-recipient computing device 106. A screen-recipient user 116 uses screen-recipient computing device 108. In other examples, system 100 may include more, fewer, or different components. For instance, computing system 100 may include multiple screen-recipient computing devices. Computing system 110 may include one or more computing devices. In examples where computing system 110 includes two or more computing devices, the computing devices of computing system 110 may act together as a system. Example types of computing devices include server devices, personal computers, mobile devices (e.g., smartphones, tablet computers, wearable devices), intermediate network devices, and so on.

As noted above, message-sending user 112 may use message-sending computing device 102 to send a message 118 to message-recipient user 114. For instance, message-sending user 112 may use message-sending computing device 102 to send an email message, chat message, or other type of message to message-recipient user 114. Message 118 may include sensitive information that message-sending user 112 does not want shared with people other than message-recipient user 114 or does not want shared with untrusted users. For instance, message 118 may include private health information, financial information, legal information, personally identifying information, and so on.

Message-recipient computing device 106 may be configured to present a notification when message-recipient computing device 106 receives a message. For example, message-recipient computing device 106 may present a notification in a corner of a display screen to indicate the arrival of the message. The notification may include some or all of the content of the message. For instance, the notification may include text identifying message-sending user 112, a subject line of message 118, some or all content of a body of message 118, and/or other information. Aside from presenting a notification when message-recipient computing device 106 receives a message, message-recipient computing device 106 may show the message in an inbox or chat window that might be open on a display screen of message-recipient computing device 106.

Furthermore, as noted above, message-recipient computing device 106 may be sharing screen content 120 with a screen-recipient computing device 108. Thus, screen-recipient user 116 may be able to see the content of the display screen of message-recipient computing device 106. Because a notification may appear on the display screen of message-recipient computing device 106 or information regarding the message may otherwise appear on the display screen of message-recipient computing device 106, screen-recipient user 116 may be able to see the notification or other information regarding the message. In this way, sensitive information in the message may be shared with screen-recipient user 116 despite neither message-sending user 112 nor message-recipient user 114 intending to share the sensitive information with screen-recipient user 116.

In accordance with a technique of this disclosure, guardian system 104 may be configured to perform actions that may reduce the risk that sensitive information is shared with untrusted users, e.g., screen-recipient user 116. As described in this disclosure, guardian system 104 may determine that message-sending computing device 102 (i.e., message-sending user 112) has received an indication of user input associated with sending message 118 to a user of message-recipient computing device 106 (i.e., message-recipient user 114). Prior to message 118 being delivered to message-recipient computing device 106, guardian system 104 may calculate a screen sharing risk score (SSRS) that indicates a risk that message-recipient computing device 106 is currently sharing screen content of a screen of message-recipient computing device 106 with a screen-recipient computing device, such as screen-recipient computing device 108, associated with an untrusted screen-recipient user (e.g., screen-recipient user 116). In general, a trusted screen-recipient user is a user who is trusted by message-sending user 112 to view message 118, even if message 118 is not directed to the user. In contrast, an untrusted screen-recipient user is a user who is not trusted by message-sending user 112 to view message 118.

Guardian system 104 may determine the SSRS based on score basis data 122 obtained from message-recipient computing device 106 and/or other data. In some examples, to determine the SSRS, guardian system 104 may assign values to variables within score basis data 122. The variables within score basis data 122 may include variables indicating whether individual screen sharing applications installed on message-recipient computing device 106, variables indicating whether individual screen sharing applications are in use, variables indicating whether a full screen of message-recipient computing device 106 is being shared, variables indicating how many monitors are connected to message-recipient computing device 106, variables indicating whether individual messaging applications are configured to receive messages on message-recipient computing device 106, variables indicating whether any screen-recipient user is untrusted for a category associated with the message, variables indicating whether individual topics are being discussed during a screen sharing session, and so on. Guardian system 104 may normalize the variables to a common scale (e.g., 0 to 1).

In some examples, guardian system 104 may calculate the SSRS as a weighted average of the values of the variables. The weights that guardian system 104 uses to calculate the weighted average may be determined heuristically offline. In some examples, guardian system 104 may use a regression model, such as a linear or logistic regression model, to determine the SSRS based on the values of the variables. For instance, in some examples, during the training phase, training personnel may generate training data by assigning SSRS's (or SSRS classes, such as one or more of "high risk," "low risk", etc., corresponding to SSRS's) to sets of training values for the variables. In this example, guardian system 104 may use this training data to train a linear regression model, a logistic regression model, or another type of model. In some examples, guardian system 104 may use a neural network model to determine the SSRS. The neural network may include input neurons that correspond to variables of score basis data 122. The neural network may include an output neuron that outputs the SSRS. In other examples, guardian system 104 may use another type of machine learning model.

In some examples where there are multiple screen-recipient users, guardian system 104 may determine a separate SSRS for each of the screen-recipient users. In such examples, guardian system 104 may determine an SSRS for an individual screen-recipient user in much the same way as described elsewhere in this disclosure. However, the variables in the score basis data used to determine the SSRS for an individual screen-recipient user may be limited to the data regarding the individual screen-recipient user instead of multiple screen-recipient users. For example, one of the variables may indicate whether the individual screen-recipient user is trusted for a category associated with the message, instead of whether any screen-recipient user is untrusted for the category associated with the message.

In response to determining that the SSRS does not indicate that the risk is above the risk threshold, guardian system 104 may forward message 118 for delivery to message-recipient computing device 106. However, based on the SSRS indicating that the risk is above a risk threshold, guardian system 104 may cause message-sending computing device 102 to output an alert 124 (e.g., to message-sending user 112) indicating that message-recipient computing device 106 may currently be sharing screen content 120 with an untrusted user. If the SSRS indicates that the risk is above the risk threshold, guardian system 104 does not immediately forward message 118 for delivery to message-recipient computing device 106. In examples where guardian system 104 determines SSRS's for individual screen-recipient users, guardian system 104 may cause message-sending computing device 102 to output alert 124 based on any of the SSRS's indicating a risk that is above the risk threshold.

Alert 124 may prompt message-sending user 112 to indicate whether to forward message 118 for delivery to message-recipient user 114 immediately or to temporarily withhold message 118. In response to message-sending computing device 102 receiving an indication of user input from message-sending user 112 to forward message 118 immediately, message-sending computing device 102 may send a command 126 to guardian system 104 that instructs guardian system 104 to forward message 118 for delivery to message-recipient computing device 106. In response to message-sending computing device 102 receiving an indication of user input from message-sending user 112 to hold message 118, command 126 may instruct guardian system 104 to temporarily withhold message 118 from delivery to message-recipient computing device 106. In some examples, message-sending computing device 106 may automatically send command 126 to temporarily withhold message 118 from delivery to message-recipient computing device 106 or to forward message 118 for delivery to message-recipient computing device 106. Message-sending computing device 106 may automatically determine whether to send a command to withhold or forward message 118 based on rules in a rule base, which may be configured by message-sending user 112 or another party.

In response to receiving command 126 instructing guardian system 104 to withhold message 118 from delivery to message-recipient computing device 106, guardian system 104 does not immediately forward message 118 for delivery to message-recipient computing device 106. For example, guardian system 104 may hold message 118 for a given period of time. In some examples, guardian system 104 may hold message 118 until guardian system 104 determines that message-recipient computing device 106 is no longer sharing screen content 120 with an untrusted screen-recipient user. For instance, in such examples, guardian system 104 may hold message 118 until guardian system 104 determines that the SSRS indicates a risk that is below the risk threshold.

Figure 2:
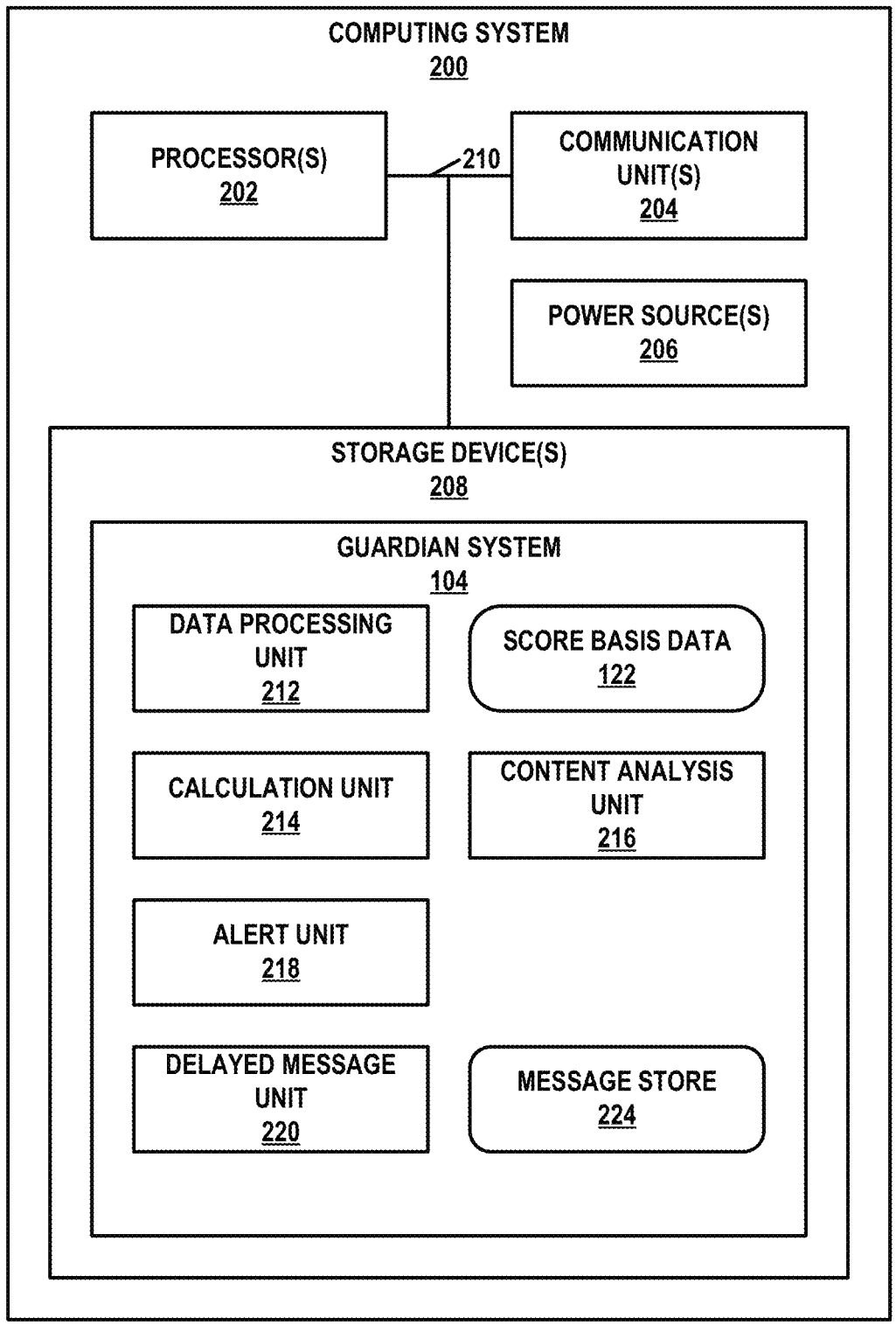
FIG. 2 is a block diagram illustrating an example computing system that implements a guardian system in accordance with one or more aspects of this disclosure.

FIG. 2 is a block diagram illustrating example components of computing system 200 in accordance with one or more aspects of this disclosure. FIG. 2 illustrates only one example of computing system 200, without limitation on many other example configurations of computing system 200. Computing system 200 may be the same as message-sending computing device 102 or may comprise a separate system of one or more computing devices.

As shown in the example of FIG. 2, computing system 200 includes one or more processors 202, one or more communication units 204, one or more power sources 206, one or more storage devices 208, and one or more communication channels 210. Computing system 200 may include other components. For example, computing system 200 may include input devices, output devices, display screens, and so on. Communication channel(s) 210 may interconnect each of processor(s) 202, communication unit(s) 204, and storage device(s) 208 for inter-component communications (physically, communicatively, and/or operatively). In some examples, communication channel(s) 210 may include a system bus, a network connection, an inter-process communication data structure, or any other method for communicating data. Power source(s) 504 may provide electrical energy to processor(s) 202, communication unit(s) 204, storage device(s) 206 and communication channel(s) 210. Storage device(s) 208 may store information required for use during operation of computing system 200.

Processor(s) 202 comprise circuitry configured to perform processing functions. For instance, one or more of processor(s) 202 may be a microprocessor, an application-specific integrated circuit (ASIC), a field-programmable gate array (FPGA), or another type of processing circuitry. In some examples, processor(s) 202 of computing system 200 may read and may execute instructions stored by storage device(s) 208. Processor(s) 202 may include fixed-function processors and/or programmable processors. Processor(s) 202 may be included in a single device or distributed among multiple devices.

Communication unit(s) 204 may enable computing system 200 to send data to and receive data from one or more other computing devices (e.g., via a communications network, such as a local area network or the Internet). In some examples, communication unit(s) 204 may include wireless transmitters and receivers that enable computing system 200 to communicate wirelessly with other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 200 may use communication unit(s) 204 to communicate with one or more other computing devices or systems, such as client device 104. Communication unit(s) 204 may be included in a single device or distributed among multiple devices.

Processor(s) 202 may read instructions from storage device(s) 208 and may execute instructions stored by storage device(s) 208. Execution of the instructions by processor(s) 202 may configure or cause computing system 200 to provide at least some of the functionality ascribed in this disclosure to computing system 200. Storage device(s) 208 may be included in a single device or distributed among multiple devices.

As shown in the example of FIG. 2, storage device(s) 208 may include computer-readable instructions associated with guardian system 104. In the example of FIG. 2, guardian system 104 includes a data processing unit 212, a calculation unit 214, a content analysis unit 216, an alert unit 218, and a delayed message unit 220. Additionally, guardian system 104 may include score basis data 122 and a message store 224. The components of guardian system 104 are described for purposes of explanation and may not reflect actual units of software or data within guardian system 104. In some examples, guardian system 104 is implemented as part of a messaging server, such as an email server, instant messaging server, or other system that facilitates communication of messages. In other examples, guardian system 104 is implemented separately from a messaging server. In some examples, guardian system 104 may operate independently of, or in communication with, the messaging server.

Data processing unit 212 may obtain score basis data 122 from message-recipient computing device 106 and store score basis data 122 in storage device(s) 208. Score basis data 122 may include one or more types of data. For example, score basis data 122 may include data indicating which screen sharing capable applications are installed on message-recipient computing device 106 and data indicating which screen sharing capable applications are in use. In some examples, score basis data 122 may include data indicating whether any of the screen sharing capable applications are actively sharing screen content. In some examples where score basis data 122 includes data indicating whether any of the screen sharing capable applications are actively sharing screen content, score basis data 122 may also include data indicating what type of screen sharing is occurring (e.g., sharing of an individual window, sharing of an entire desktop, sharing of an application, sharing of a virtual whiteboard, etc.). In some examples, score basis data 122 may determine how many monitors are connected to message-recipient computing device 106.

In some examples, score basis data 122 may indicate which application or messaging platform message-sending user 112 is using to send message 118 to message-recipient user 114. In some examples, score basis data 122 may indicate which application or message platform message-recipient user 114 is using to receive message 118. For instance, different email client applications may present notifications and email messages differently. Accordingly, different email client applications may present different levels of risk that sensitive information in message 118 may be shared in screen content 120. Similarly, score basis data 122 may indicate which operating system is running on message-recipient computing device 106. Different operating systems may present notifications differently and therefore may present different levels of risk that sensitive information in message 118 may be shared in screen content 120.

In some examples, score basis data 122 may indicate which monitor of message-recipient computing system 106 displays notifications regarding incoming messages. In such examples, data processing unit 212 may determine whether the monitor of message-recipient computing system 106 that displays notifications regarding incoming messages is the same as the monitor of message-recipient computing system 106 that contains shared screen content 120.

In some examples, score basis data 122 may include data that identify screen-recipient users, such as screen-recipient user 116, that are receiving screen content shared by message-recipient computing device 106. In some such examples, data processing unit 212 may determine categories for the screen-recipient users. For instance, it may not be a problem to share sensitive information with some categories of screen-recipient users (e.g., trusted users) but it may be a problem to share the same sensitive information with other categories of screen-recipient users (e.g., untrusted users). For instance, if message 118 contains corporate accounting data, it may not be a problem if the corporate accounting data is shared with other members of a corporate accounting team, but it may be a problem if the corporate accounting data is shared with screen-recipient users outside the corporate accounting team. To determine the categories of the screen-recipient users, data processing unit 212 may access a database that maps users to categories. In some examples, score basis data 122 obtained by data processing unit 212 may directly indicate the categories of the screen-recipient users. Guardian system 104 may determine the SSRS based in part on the categories of the screen-recipient users. For instance, guardian system 104 may determine a value of a variable that indicates whether any of the screen-recipient users is in a category that makes the screen-recipient user untrusted by message-sending user 112 for purposes of message 118. Guardian system 104 may use this variable in a weighted average calculation, a regression calculation, in a machine-learning model, or another process to determine the SSRS.

In some examples, score basis data 122 may include profile data for users. The profile data for users may include data indicating projects on which the users are working, roles associated with the users, departments associated with the users, and other information about the users. In general, there may be less risk associated with sensitive information, such as project-related sensitive information, being shared if message-recipient user 114 and screen-recipient users (e.g., screen-recipient user 116) are associated with the same project, have the same roles, work in the same department, and so on. In other words, certain screen-recipient users may be trusted with respect to certain categories of sensitive information if the screen-recipient users and message-recipient user 114 are associated with the same project, have the same roles, work in the same department, etc.

In some examples, a software module installed on message-recipient computing device 106 may collect score basis data 122 and may send score basis data 122 to guardian system 104. For instance, the software module may implement an Application Programming Interface (API) that data processing unit 212 may use to receive score basis data 122 from message-recipient computing device 106.

Content analysis unit 216 may determine one or more categories associated with the content of message 118. For instance, content analysis unit 216 may determine that the content of message 118 is associated with various categories such as financial data, personal health information, personally identifying information, legal information, technical information, social information, and so on.

Content analysis unit 216 may determine the categories associated with the content of message 118 in one or more of a variety of ways. For example, content analysis unit 216 may perform natural language processing (NLP) on message 118 to determine the categories associated with the content of message 118. For instance, in this example, when performing NLP on message 118, content analysis unit 216 may use a topic modeling process. As part of the topic modeling process, content analysis unit 216 may parse message 118 to identify nouns, verbs, and other parts of speech within the content of message 118. Content analysis unit 216 may compare the nouns and verbs to lists of words associated with individual categories. Content analysis unit 216 may determine that the content of message 118 is associated with a specific category if message 118 contains at least a given number of nouns or verbs associated with the specific category or a ratio of nouns and verbs associated with the specific category compared to nouns and verbs associated with other categories is greater than a predetermined threshold.

In some examples, content analysis unit 216 may use a machine-learned (ML) model to determine one or more categories associated with the content of message 118. For instance, in this example, a neural network model (e.g., a Long Short-Term Memory (LSTM) model, an attention model, a transformer model, or a reformer model) may be trained to generate output data indicating confidence levels for each category of a plurality of categories. The confidence level for a category may indicate a level of confidence that message 118 is associated with the category. The neural network model may include one or more hidden layers.

In some examples, content analysis unit 216 may also determine one or more categories associated with screen content 120. For instance, in one example, content analysis unit 216 may obtain (e.g., from score basis data 222) information regarding a calendar appointment associated with screen content 120. In this example, the calendar appointment may include a subject line containing words associated with one or more categories. In some examples, content analysis unit 216 may determine the one or more categories associated with screen content 120 based on invitees listed in the calendar appointment associated with screen content 120. The invitees are the likely screen-recipient users. For instance, in this example, content analysis unit 216 may determine categories associated with the invitees and, based on the categories associated with the invitees, determine likely categories of screen content 120. For instance, if each of the invitees is a member of a corporate accounting team, it is likely that screen content 120 is associated with corporate accounting data. In some examples, a software unit operating on message-recipient computing device 106 may perform natural language processing on content exchanged during a screen sharing session to determine one or more categories associated with screen content 120. Such content may include spoken content, slides, an agenda, shared documents, and so on. In such examples, message-recipient user 114 and screen-recipient user 116 may choose to provide indications of consent that content exchanged during the screen sharing session may be recorded and analyzed for this purpose.

Content analysis unit 216 may compare the categories associated with the content of message 118 to the categories associated with screen content 120. In general, if the categories associated with the content of message 118 are the same as the categories associated with screen content 120, there is less risk associated with sensitive information in message 118 being shared with an untrusted screen-recipient user. However, if the categories associated with the content of message 118 do not overlap with the categories associated with screen content 120, there is greater risk associated with sensitive information in message 118 being shared with an untrusted screen-recipient user.

In some examples, content analysis unit 216 may determine a context of message 118. Even if the categories associated with the content of message 118 are the same as the categories associated with screen content 120, content analysis unit 216 may determine, based on the context of the message, that there is elevated risk associated with sensitive information in message 118 being shared with one or more screen-recipient users. For instance, if message-sending user 112 is sending a message to a first colleague criticizing a second colleague while the first colleague is sharing content with the second colleague related to the same subject matter as the message, message-sending user 112 may not want the message to be delivered to the computing device of the first colleague.

Accordingly, in some examples, content analysis unit 216 may generate context data based on messages obtained by guardian system 104. The context data may include records identifying message-sending users of messages, message-recipient users of messages, message content information of the messages, people related to (e.g., mentioned in) the messages, and sentiment regarding the people related to the messages. For instance, an individual record may specify a message-sending user of a message, one or more message-recipient users of the message, one or more content categories of the message, one or more people related to the message, and sentiment data regarding the people related to the message. In some examples, content analysis unit 216 may generate consolidated records that determine averaged sentiment data for messages having the same message-sending users, message-recipient users, content categories, and related users. Content analysis unit 216 may use a message sentiment analysis process to determine the sentiment regarding the people related to the one or more messages. Sentiment may range from negative sentiment (e.g., anger, disgust, bitterness, unhappiness, etc.) to neutral sentiment to positive sentiment (e.g., happiness, satisfaction, etc.). The sentiment analysis process may use a machine learning process (e.g., neural network), word-matching process, or other process. To determine the context of a new message, content analysis unit 216 may analyze the new message to identify people related to the new message and to determine a topic of the new message. Content analysis unit 216 may then search the context data for records specifying message-sending user 112 as the sender, message-recipient user 114 as the recipient, the identified people related to the new message, and the determined topic. If content analysis unit 216 identifies one or more such records, content analysis unit 216 may use the sentiment indicated by the records as part of determining the SSRS. For example, if the records indicate a generally negative sentiment, content analysis unit 216 may set a variable to a first value. If the records indicate a generally positive sentiment, content analysis unit 216 may set the variable to a second, different value. Calculation unit 214 may then use the value of this variable, e.g., among other variables, to determine the SSRS. Thus, depending on the ultimate value of the SSRS, an alert may be presented to message-sending user 114, message-recipient computing device 106 may obscure a notification regarding the message, or another action may be taken.

In some circumstances, it may be undesirable for message-recipient computing device 106 to output a notification of a message unless message-recipient user 114 is actually looking at a screen of message-recipient computing device 106 because otherwise someone other than message-recipient user 114 may be able to see the notification of the message while not providing any benefit to message-recipient user 114. In some examples, score basis data 122 may include information that indicates whether message-recipient user 114 is currently looking at a screen of message-recipient computing device 106. The variables used to determine the SSRS may include a variable indicating whether message-recipient user 114 is looking at a screen of message-recipient computing device 106. A device, such as message-recipient computing device 106, may use image data from a camera, such as a camera connected to message-recipient computing device 106, to determine (e.g., by applying an image recognition system) whether message-recipient computing user 114 is looking at a screen of message-recipient computing device 106.

In some examples, score basis data 122 may include information indicating log-in identifiers (e.g., user ids) of applications (e.g., native applications, web applications, etc.) in use on message-recipient computing device 106. The log-in identifiers may be retrieved (e.g., by guardian system 104, an application running on message-recipient computing device 106, etc.) using one or more API calls, or by using other types of operations. Content analysis unit 216 may determine how many different log-in identifiers are in use on message-recipient computing device 106. The number of different log-in identifiers may be one of the variables used in determining the SSRS. In an example where the applications are different messaging applications (e.g., email applications, chat applications, etc.) and message 118 is sent to an address of a first user who is associated with a log-in identifier used in a first messaging application, and a second user who is associated with a log-in identifier used in a second message application is sharing screen content. In this example, the screen-recipient users may obtain sensitive information in a message that was not even intended to be received by the second user. Accordingly, use of the number of different log-ins as a variable in determining the SSRS may help to prevent the message from being delivered to message-recipient computing device 106 in this situation.

Calculation unit 214 may determine a SSRS based on score basis data 122. In some examples, the SSRS may range from 0 to 1, with 0 denoting least risk and 1 denoting greatest risk. Calculation unit 214 may determine the SSRS as described in any of the examples for calculating or determining the SSRS provided elsewhere in this disclosure.

Alert unit 218 may compare the SSRS to a risk threshold. Based on the SSRS indicating a risk that is above the risk threshold, alert unit 218 may cause message-sending computing device 102 to output an alert to message-sending user 112 indicating that message-recipient computing device 106 may currently be sharing screen content 120 with an untrusted screen-recipient user. Otherwise, alert unit 218 may forward message 118 for delivery to message-recipient computing device 106.

Alert unit 218 may use different risk thresholds in different situations and/or different recipients. For instance, guardian system 104 may receive data indicating that message-sending user 112 has specified different risk thresholds for different potential recipients. Thus, in this example, when guardian system 104 receives a message sent by message-sending user 112 to message-recipient user 114, alert unit 218 may use the risk threshold specified by message-sending user 112 for message-recipient user 114. In some examples, guardian system 104 may receive data indicating that message-recipient user 114 has specified a risk threshold for message-sending user 112. Thus, in this example, when guardian system 104 receives a message sent by message-sending user 112 to message-recipient user 114, alert unit 218 may use the risk threshold specified by message-recipient user 114 for message-sending user 112.

In some examples, alert unit 218 may use different risk thresholds when different categories are associated with content of message 118. For instance, content analysis unit 216 may determine that message 118 includes a specific category, e.g., financial data, legal data, personal data, health data, etc. Alert unit 218 may determine a risk threshold based on the category associated with content of message 118. For instance, to determine the risk threshold based on the category associated with content of message 118, alert unit 218 may access a database containing data that map categories to risk thresholds. Alert unit 218 may then compare the SSRS to a risk threshold corresponding to the category associated with the content of message 118. For instance, alert unit 218 may use a first risk threshold if message 118 contains financial data and a second risk threshold if message 118 contains health data.

Alert unit 218 may receive a command 126 in response to alert 124. Command 126 may instruct alert unit 218 to send message 118 immediately. In response to determining that command 126 instructs alert unit 218 to send message 118 immediately, alert unit 218 may forward message 118 for delivery to message-recipient computing device 106. For example, alert unit 218 may send message 118 to a server for delivery to message-recipient computing device 106. In another example, alert unit 218 may send a messaging to a messaging server instructing the messaging server to send message 118. Alternatively, command 126 may instruct alert unit 218 to hold message 118. In response to determining that command 126 instructs alert unit 218 to hold message 118, alert unit 218 may add message 118 to message store 224 for later delivery to message-recipient computing device 106.

Delayed message unit 220 may manage messages stored in message store 224. For example, delayed message unit 220 may utilize calculation unit 214 to recalculate SSRSs for message-recipient users associated with messages stored in message store 224. In this example, if delayed message unit 220 determines that the SSRS for a message-recipient user associated with a message is below a risk threshold corresponding to the message, delayed message unit 220 may forward the message for delivery to a message-recipient computing device associated with the message-recipient user. In some examples, if delayed message unit 220 determines a time limit associated with a message stored in message store 224 has expired, delayed message unit 220 may forward the message for delivery to a message-recipient computing device associated with the message-recipient user. In some examples, if delayed message unit 220 determines a time limit associated with a message stored in message store 224 has expired, calculation unit 214 may determine the SSRS for the message-recipient user again and may forward the message for delivery to a message-recipient computing device associated with the message-recipient user if the SSRS is below the risk threshold, and continue to hold the message otherwise. In some examples, delayed message unit 220 may cause message-sending computing device 102 to notify message-sending user 112 after a specific number of recalculations of the SSRS. In some examples where a time limit has expired and the SSRS remains above the risk threshold, delayed message unit 220 may cause message-sending computing device 102 to output a notification requesting message-sending user 112 to provide input to extend the time limit or allow message 118 to expire.

Figure 3A:
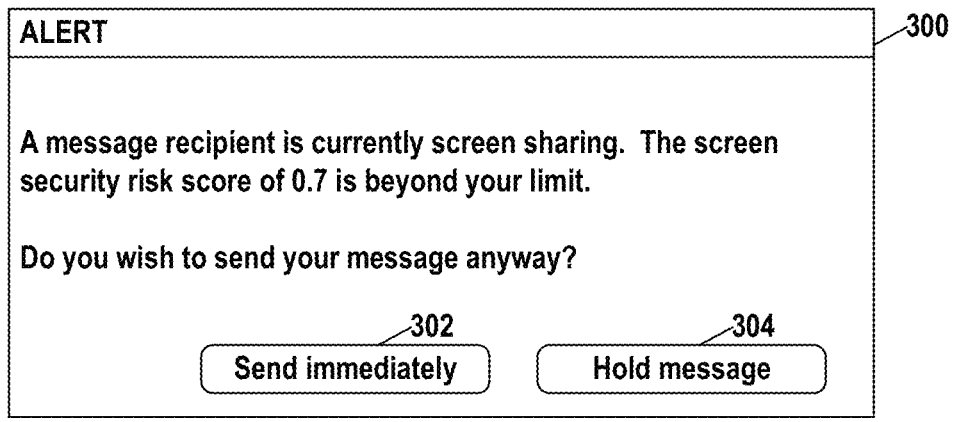
FIG. 3A and FIG. 3B are conceptual diagrams illustrating example alerts in accordance with one or more aspects of this disclosure.
Figure 3B:
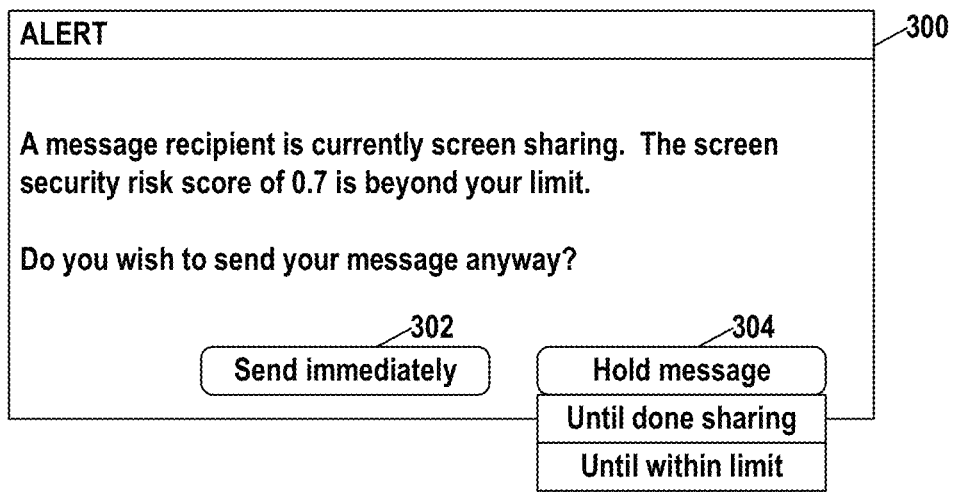

FIG. 3A and FIG. 3B are conceptual diagrams illustrating example alerts in accordance with one or more aspects of this disclosure. In the example of FIG. 3A, an alert 300 contains text that informs message-sending user 112 that a recipient of a message (e.g., message-recipient user 114) is screen sharing, potentially with an untrusted screen-recipient user. Alert 300 also indicates the SSRS. In the example of FIG. 3A, the SSRS is equal to 0.7. In examples where guardian system 104 determines multiple SSRS's for individual screen-recipient users, alert 300 may include one or more of the SSRS's for the individual users. Alert 300 includes a feature 302 and a feature 304. Selection of feature 302 instructs guardian system 104 to forward the message for delivery to message-recipient computing device 106 immediately, regardless of the SSRS indicating a risk that the recipient of the message is currently sharing screen content with an untrusted user. In some examples where guardian system 104 receives an indication of user input to forward the message for delivery to message-recipient computing device 106 immediately, one or more parts of the message may be obscured when displayed on message-recipient computing device 106. For example, message-recipient computing device 106 may be configured to obscure (e.g., hash-block or mask) some or all content of the message, e.g., a subject line, sender, etc., upon receiving the message. In some examples, guardian system 104 may include an indication in the message (or an indication otherwise associated with the message) to indicate to message-recipient computing device 106 to obscure certain content of the message.

Message-sending computing device 102 may present options for holding the message in response to receiving an indication of user input to select feature 304. For instance, as shown in the example of FIG. 3B, options for holding the message may include holding the message until message-recipient user 114 has finished screen sharing and holding the message until a time limit has expired, regardless of whether message-recipient user 114 is still screen sharing.

Figure 4A:
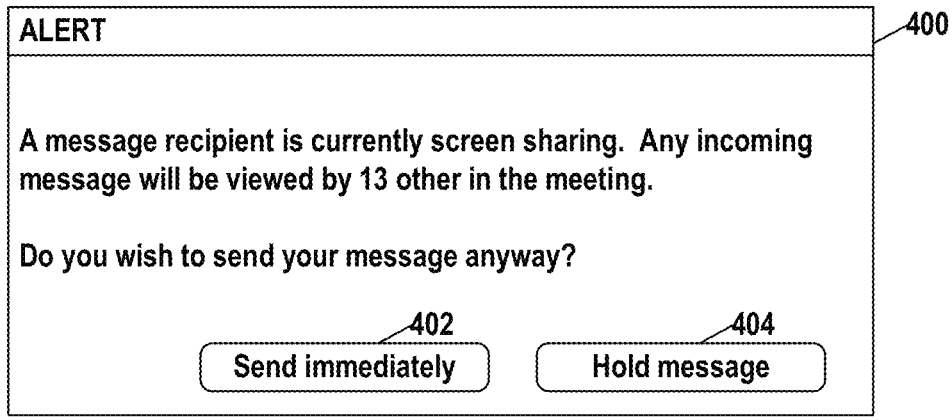
FIG. 4A and FIG. 4B are conceptual diagrams illustrating additional example alerts in accordance with one or more aspects of this disclosure.
Figure 4B:
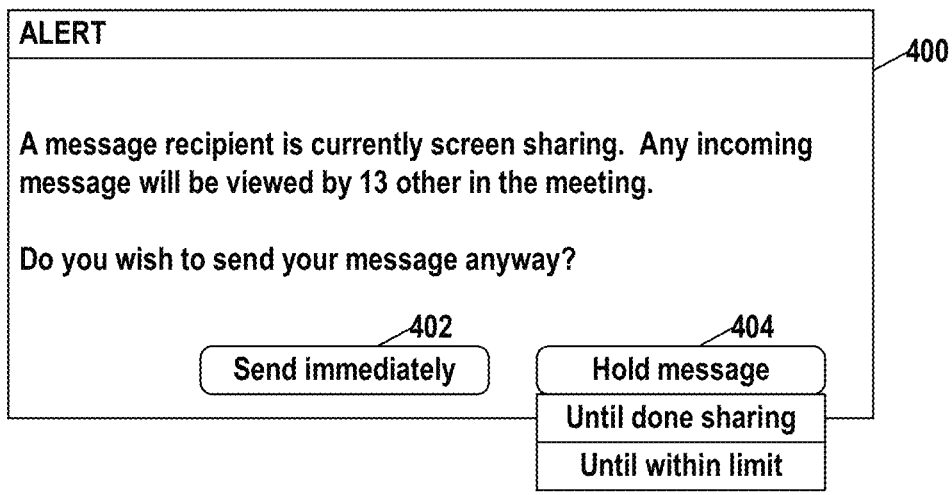

FIG. 4A and FIG. 4B are conceptual diagrams illustrating additional example alerts in accordance with one or more aspects of this disclosure. In the example of FIG. 4A and FIG. 4B, an alert 400 contains text and features 402 and 404. Features 402 and 404 operate in a similar manner to features 302 and 304 of FIG. 3A and FIG. 3B. Alert 400 differs from alert 300 in that alert 400 indicates an estimated number of people who might see the message because message-recipient user 114 is sharing their screen.

In other examples, alerts may include more, fewer, or different information than shown in alert 300 and alert 400. For example, alerts may include information such as categories associated with message 118, categories associated with screen content 120, projects/departments/roles/etc. shared with message-recipient user 114 and screen-recipient users (e.g., screen-recipient user 116), and/or other information. In some examples, users may configure which information is shown in alerts.

In some examples, guardian system 104 may track responses of message-sending user 112 to alerts and adapt based on the responses of message-sending user 112 to alerts. For example, guardian system 104 may increase a risk threshold associated with a specific message-recipient user if message-sending user 112 frequently responds to alerts regarding messages to the specific message-recipient user with commands to send the messages immediately.

Figure 5:
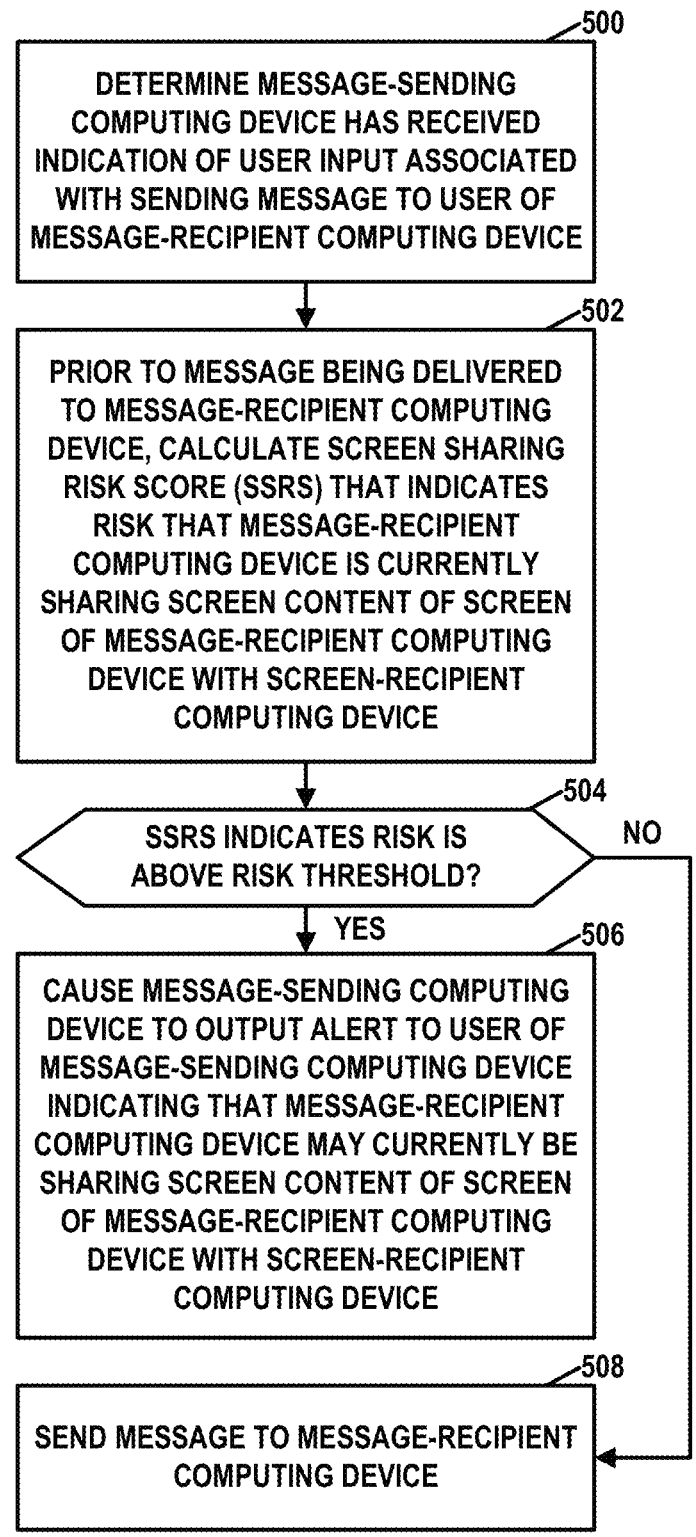
FIG. 5 is a flowchart illustrating an example operation of a guardian system in accordance with one or more aspects of this disclosure.

FIG. 5 is a flow diagram illustrating an example operation of guardian system 104 in accordance with one or more aspects of this disclosure. The example of FIG. 5 is described with respect to the example of FIG. 1 and FIG. 2 but is not so limited.

In the example of FIG. 5, guardian system 104 may determine that message-sending computing device 102 has received an indication of user input indicating an intent of message-sending user 112 to send message 118 to message-recipient user 114 (500). Message 118 may be an email message, a chat message, or another type of message. In some examples, guardian system 104 may determine that message-sending computing device 102 has received an indication of user input associated with sending message 118 to message-recipient user 114 when guardian system 104 intercepts message 118 after message-sending computing device 102 has sent the message. In some examples, guardian system 104 may determine that message-sending computing device 102 has received an indication of user input indicating an intent to send message 118 to message-recipient user 114 when guardian system 104 determines that message-sending computing device 102 has received an indication of user input indicating that user 112 has selected a user interface control (e.g., a "send" button) to send the message. In some examples, guardian system 104 may determine that message-sending computing device 102 has received an indication of user input indicating an intent to send message 118 to message-recipient user 114 when message-sending computing device 102 receives user input of an email address or other data indicating that the message is to be sent to message-recipient user 114. Thus, in this example, guardian system 104 may determine that message-sending computing device 102 has received an indication of user input indicating an intent to send message 118 to message-recipient user 114 even before message-sending computing device 102 receives an indication of user input to actually send message 118. Determining that message-sending computing device 102 has received an indication of user input indicating an intent to send message 118 to message-recipient user 114 (e.g., by receiving input of an email address of message-recipient user 114) before message-sending computing device 102 receives the indication of user input to actually send message 118 may enable guardian system 104 to respond more quickly with an alert when message-sending computing device 102 receives the indication of user input to send message, or may enable guardian system 104 to cause message-sending computing device 102 to output the alert even before message-sending user 112 commits time to composing message 118. In examples where guardian system 104 determines that message-sending computing device 102 has received user input indicating an intent to send message 118 to message-recipient user 114 prior to message-sending computing device 102 receiving an indication of user input to command message-sending computing device 102 to send message 118, guardian system 104 may use an API implemented by message-sending computing device 102 to retrieve information to make this determination, or message-sending computing device 102 may be configured to use an API of guardian system 104 to send information needed to make the determination to guardian system 104.

Prior to the message being delivered to message-recipient computing device 106, guardian system 104 may calculate a SSRS that indicates a risk that the message-recipient computing device is currently sharing screen content of a screen of message-recipient computing device 106 with screen-recipient computing device 108 (502). For instance, in some examples, guardian system 104 may calculate the SSRS in response to determining that message-sending computing device 102 has received an indication of user input indicating an intent to send the message to message-recipient user 114. In some examples, guardian system 104 may calculate the SSRS prior to determining that message-sending computing device 102 has received an indication of user input associated with sending the message to message-recipient user 114. For instance, guardian system 104 may calculate the SSRS for message-recipient user 114 on a periodic basis, independent of whether other users intend to send messages to message-recipient user 114. In some examples, guardian system 104 may use a machine-learned model to predict which users are likely to be recipients of messages at specific times of day and may preemptively calculate SSRS's for such users.

In some examples, content analysis unit 216 may analyze the content of message 118 to determine one or more categories associated with the content of message 118. In response to determining that message 118 includes sensitive information, such as personal health information or personally identifying information, guardian system 104 may calculate, retrieve, or otherwise obtain the SSRS for use in determining whether to forward message 118 for delivery to message-recipient computing device 106. In such examples, if content analysis unit 216 determines that message 118 does not include sensitive information, guardian system 104 does not calculate, retrieve, or otherwise obtain or use the SSRS with respect to message 118.

Guardian system 104 may then determine whether the SSRS indicates a risk that is above a risk threshold (504). For instance, guardian system 104 may compare the SSRS to the risk threshold to determine whether the risk is above the risk threshold. The risk threshold may be determined in one of various ways. For example, the risk threshold may be a predetermined value that is the same for all users. In some examples, the risk threshold may be a user-specific threshold set by message-sending users.

Based on the SSRS indicating that the risk is above the risk threshold ("YES" branch of 504), guardian system 104 may cause message-sending computing device 102 to output an alert to message-sending user 112 indicating that message-recipient computing device 106 may currently be sharing the screen content of message-recipient computing device 106 with the screen-recipient computing device associated with the untrusted screen-recipient user (506). For instance, guardian system 104 may send a request to message-sending computing device 102 to output an alert, such as alert 300 (FIG. 3A and FIG. 3B) or alert 400 (FIG. 4A and FIG. 4B). Message-sending computing device 102 may implement an API that is configured to receive and process such requests from guardian system 104. In some examples, such as the examples of FIG. 3A and FIG. 3B, guardian system 104 may determine a numerical value based on the SSRS and include the numerical value in the alert. The numerical value based on the SSRS may be the same as the SSRS, derived through an arithmetic equation from the SSRS, or otherwise determined from the SSRS.

In some examples, such as the examples of FIGS. 3A, 3B, 4A, and 4B, the alert provides message-sending user 112 with an option of holding message 118. Accordingly, in such examples, guardian system 104 may receive, in response to the alert, a command 126 to hold message 118. In response to command 126 to hold message 118, guardian system 104 may delay forwarding message 118 for delivery to message-recipient computing device 106. For instance, guardian system 104 may store message 118 in message store 224 for later forwarding of message 118 for delivery to message-recipient computing device 106. Guardian system 104 may subsequently recalculate the SSRS and determine whether to forward message 118 for delivery to message-recipient computing device 106 based on the recalculated SSRS. For instance, guardian system 104 may forward message 118 for delivery to message-recipient computing device 106 if the recalculated SSRS is below the risk threshold.

In some examples, when the SSRS indicates a risk that is above the risk threshold, guardian system 104 may cause a device other than message-sending computing device 102 to perform an action to notify message-sending user 112. For example, guardian system 104 may cause an alert to appear on a mobile device of message-recipient user 114, cause lights of an office of message-recipient user 114 to temporarily dim, cause an audio device in an environment of message-recipient user 114 to output a notification sound, and so on.

On the other hand, if the SSRS does not indicate that the risk is above the risk threshold ("NO" branch of 504), guardian system 104 may forward message 118 for delivery to message-recipient computing device 106 (508). For instance, guardian system 104 may forward message 118 to an email server or messaging server that coordinates delivery of message 118 to message-recipient computing device 106.

In some examples, message-recipient computing device 106 may implement techniques to prevent sharing of sensitive information during screen sharing sessions. For example, message-recipient computing device 106 may be configured to suppress notifications of incoming messages during screen sharing sessions. In some examples, message-recipient computing device 106 may be configured to relocate notifications of messages to a non-shared screen of message-recipient computing device 106. In some examples, message-recipient computing device 106 may be configured to use one or more IoT components (e.g., dimmable lighting fixtures, audio devices, etc.) to notify message-recipient user 114 of receipt of a message without displaying a notification on a screen of message-recipient computing device 106. In some examples, message-recipient computing device 106 may be configured to mask or otherwise obscure message 118 or a notification of message 118 on a screen of message-recipient computing device 106, e.g., if message-recipient computing device 106 is using full-screen screen sharing. In some examples, message-recipient computing device 106 may be configured to temporarily disable screen sharing and then display message 118 or a notification of message 118. In such examples, message-recipient computing device 106 may output a dialog box that prompts message-recipient user 114 to restart screen sharing (e.g., after closing the dialog box).

Figure 6:
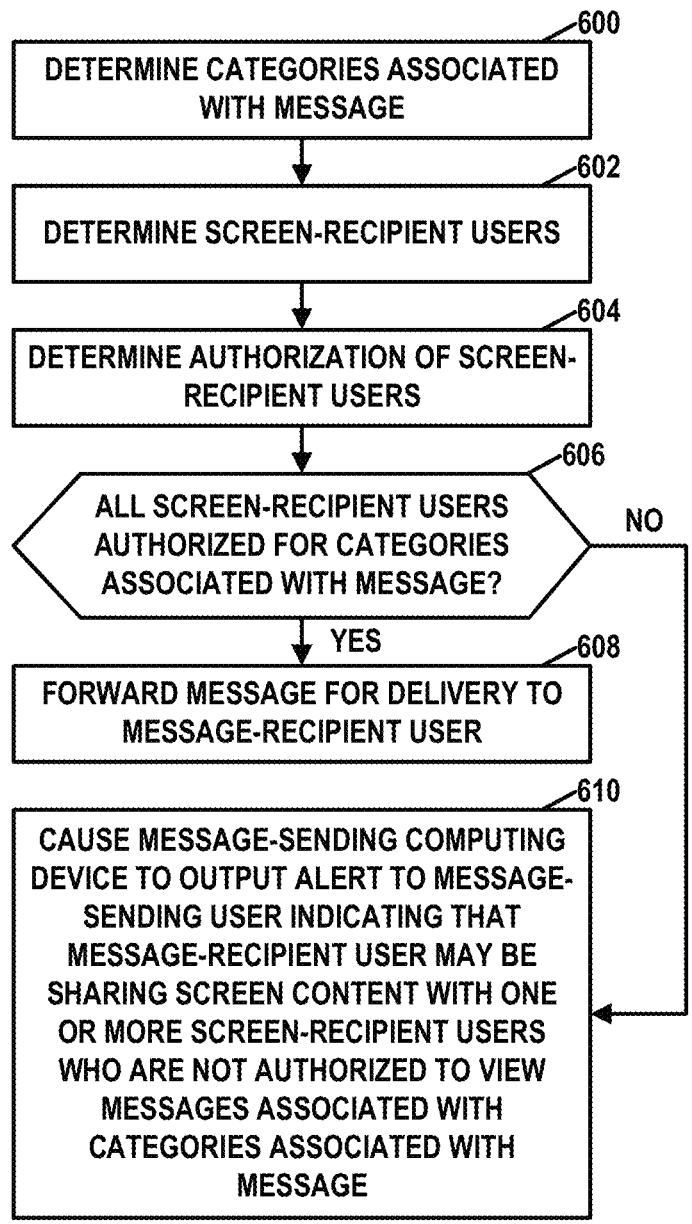
FIG. 6 is a flowchart illustrating an example operation of a guardian system in accordance with one or more aspects of this disclosure.

FIG. 6 is a flowchart illustrating an example operation of guardian system 104 in accordance with one or more aspects of this disclosure. In the example of FIG. 6, content analysis unit 216 of guardian system 104 may determine one or more categories associated with message 118 (600). Categories associated with messages may include topics, projects, departments, roles, positions in an organizational chart, types of sensitive information, and so on. Content analysis unit 216 may determine the categories associated with the message in any of the examples provided elsewhere in this disclosure.

Additionally, guardian system 104 may identify screen-recipient users (602). For example, guardian system 104 may obtain data identifying the screen-recipient users from message-recipient computing device 106, from a server system that facilitates screen sharing for message-recipient computing device 106, or from another source.

Guardian system 104 may also determine authorizations of the screen-recipient users (604). For example, to determine whether all of the screen-recipient users are authorized for the categories associated with the message, guardian system 104 may access a database that maps users to categories for which the users are authorized. In some examples, guardian system 104 may use artificial intelligence or machine learning techniques to determine the authorizations of the screen-recipient users. For instance, in one example, guardian system 104 may determine that a specific user is authorized for a specific category based on the nature of interactions with other users. For instance, guardian system 104 may (e.g., with permission from involved parties) analyze messages sent and received by the specific user to determine whether the specific user is authorized for the specific category. For example, guardian system 104 may determine that the specific user is authorized for a specific category if the specific user has received or sent messages related to the specific category. Furthermore, in some examples, guardian system 104 may determine that individual users are no longer authorized for a specific category. In such examples, guardian system 104 may determine that a user is no longer authorized for a specific category based on a duration between the user receiving messages or attending meeting regarding the specific category is greater than a threshold (e.g., 30 days).

Guardian system 104 may determine whether all of the screen-recipient users are authorized for the categories associated with the message (606). In response to determining that all of the screen-recipient users are authorized for the categories associated with the message ("YES" branch of 606), guardian system 104 may forward message 118 for delivery to message-recipient computing device 106 (608). For example, guardian system 104 may send message 118 to an email server or messaging server that coordinates delivery of message 118 to message-recipient computing device 106.

On the other hand, in response to determining that one or more of the screen-recipient users are not authorized for one or more of the categories associated with the message ("NO" branch of 606), guardian system 104 (e.g., alert unit 218 of guardian system 104) may cause message-sending computing device 102 to output an alert to message-sending user 112 indicating that message-recipient computing device 106 may be sharing screen content with one or more screen-recipient users who are not authorized to view messages associated with the categories associated with message 118 (e.g., untrusted users) (610). For example, if message 118 is associated with a corporate accounting data category and one or more of the screen-recipient users is not authorized to view messages associated with the corporate accounting data category, guardian system 104 may cause message-sending computing device 102 to output an alert indicating that one or more of the screen-recipient users is not authorized to view messages associated with the corporate accounting data category. Guardian system 104 may use an API implemented by message-sending computing device 102 to cause message-sending computing device 102 to output the alert. In some examples, guardian system 104 may forward message 118 for delivery provided that message-recipient computing device 106 is configured to obscure one or more parts of message 118 so that those parts of message 118 cannot be seen by untrusted screen-recipient users.

The following is a non-limiting list of examples that are in accordance with one or more techniques of this disclosure.

Example 1: A method includes determining, by one or more processors of a computing system, that a message-sending computing device has received an indication of user input indicating an intent to send a message to a user of a message-recipient computing device; and prior to the message being delivered to the message-recipient computing device: calculating, by the one or more processors, a screen sharing risk score (SSRS) that indicates a risk that the message-recipient computing device is currently sharing screen content of a screen of the message-recipient computing device with a screen-recipient computing device associated with an untrusted screen-recipient user; determining, by the one or more processors, whether the SSRS indicates that the risk is above a risk threshold; and based on the SSRS indicating that the risk is above the risk threshold, causing, by the one or more processors, the message-sending computing device to output an alert indicating that the message-recipient computing device is possibly currently sharing the screen content of the message-recipient computing device with the screen-recipient computing device associated with the untrusted screen-recipient user.

Example 2: The method of example 1, further includes receiving, by the one or more processors, in response to the alert, a command to hold the message; and in response to the command to hold the message: delaying, by the one or more processors, forwarding the message for delivery to the message-recipient computing device; recalculating, by the one or more processors, the SSRS; and determining, by the one or more processors, whether to forward the message for delivery to the message-recipient computing device based on the recalculated SSRS.

Example 3: The method of any of examples 1 and 2, further includes determining, by the one or more processors, a category associated with content of the message; and determining, by the one or more processors, the risk threshold based on the category associated with the content of the message.

Example 4: The method of any of examples 1 through 3, wherein the method further comprises receiving, by the one or more processors, data indicating that the user of the message-sending computing device has specified a risk threshold for the user of the message-recipient computing device; and wherein determining whether the SSRS indicates that the risk is above the risk threshold comprises determining, by the one or more processors, whether the SSRS indicates that the risk is above the risk threshold for the user of the message-recipient computing device.

Example 5: The method of any of examples 1 through 4, further comprising determining, by the one or more processors, a numerical value based on the SSRS, wherein the alert includes the numerical value.

Example 6: The method of any of examples 1 through 5, wherein determining that the message-sending computing device has received the indication of user input indicating the intent to send the message to the user of the message-recipient computing device comprises determining, by the one or more processors, prior to the message-sending computing device receiving an indication of user input to actually send the message to the user of the message-recipient computing device, that the message-sending computing device has received the indication of user input indicating the intent to send the message to the user of the message-recipient computing device.

Example 7: The method of any of examples 1 through 6, wherein the method further comprises determining, by the one or more processors, categories of screen-recipient users; and wherein calculating the SSRS comprises calculating, by the one or more processors, the SSRS based on the categories of the screen-recipient users.

Example 8: The method of any of examples 1 through 7, wherein calculating the SSRS comprises calculating the SSRS as a weighted averages of values of variables in score basis data, wherein the variables in the score basis data include one or more of: a variable indicating whether an individual screen sharing application is installed on the message-sending computing device, a variable indicating whether an individual screen sharing application is in use, a variable indicating whether a full screen of the message-recipient computing device is being shared, a variable indicating how many monitors are connected to the message-recipient computing device, a variable indicating whether a messaging application is configured to receive messages on the message-recipient computing device, a variable indicating whether any screen-recipient user is untrusted for a categories associated with the message, or a variable indicating whether a topic is being discussed during a screen sharing session.

Example 9: A computing system includes one or more storage devices configured to store score basis data; and one or more processors implemented in circuitry, the one or more processors configured to: determine that a message-sending computing device has received an indication of user input indicating an intent to send a message to a user of a message-recipient computing device; prior to the message being delivered to the message-recipient computing device, calculate, based on the score basis data, a screen sharing risk score (SSRS) that indicates a risk that the message-recipient computing device is currently sharing screen content of a screen of the message-recipient computing device with a screen-recipient computing device associated with an untrusted screen-recipient user; determine whether the SSRS indicates that the risk is above a risk threshold; and based on the SSRS indicating that the risk is above the risk threshold, cause the message-sending computing device to output an alert indicating that the message-recipient computing device is possibly currently sharing the screen content of the message-recipient computing device with the screen-recipient computing device associated with the untrusted screen-recipient user.

Example 10: The computing system of example 9, wherein the one or more processors are configured to: receive in response to the alert, a command to hold the message; and in response to the command to hold the message: delay forwarding the message for delivery to the message-recipient computing device; recalculate the SSRS, and determine whether to forward the message for delivery to the message-recipient computing device based on the recalculated SSRS.

Example 11: The computing system of any of examples 9 and 10, wherein the one or more processors are further configured to: determine a category associated with content of the message; and determine the risk threshold based on the category associated with the content of the message.

Example 12: The computing system of any of examples 9 through 11, wherein the one or more processors are further configured to receive data indicating that the user of the message-sending computing device has specified a risk threshold for the user of the message-recipient computing device; and wherein the one or more processors are configured to, as part of determining whether the SSRS indicates that the risk is above the risk threshold, determine whether the SSRS indicates that the risk is above the risk threshold for the user of the message-recipient computing device.

Example 13: The computing system of any of examples 9 through 12, wherein the one or more processors are further configured to determine a numerical value based on the SSRS, wherein the alert includes the numerical value.

Example 14: The computing system of any of examples 9 through 13, wherein the one or more processors are configured to, as part of determining that the message-sending computing device has received an indication of user input indicating an intent to send the message to the user of the message-recipient computing device, determine, prior to the message-sending computing device receiving an indication of user input to actually send the message to the user of the message-recipient computing device, that the user of the message-sending computing device has received the indication of user input indicating the intent to send the message to the user of the message-recipient computing device.

Example 15: The computing system of any of examples 9 through 14, wherein the one or more processors are further configured to determine categories of screen-recipient users;

and wherein the one or more processors are configured to calculate the SSRS based on the categories of the screen-recipient users.

Example 16: The computing system of any of examples 9 through 15, wherein the one or more processors are configured to calculate the SSRS as a weighted averages of values of variables in score basis data, wherein the variables in the score basis data include one or more of: a variable indicating whether an individual screen sharing application is installed on the message-sending computing device, a variable indicating whether an individual screen sharing application is in use, a variable indicating whether a full screen of the message-recipient computing device is being shared, a variable indicating how many monitors are connected to the message-recipient computing device, a variable indicating whether a messaging application is configured to receive messages on the message-recipient computing device, a variable indicating whether any screen-recipient user is untrusted for a categories associated with the message, or a variable indicating whether a topic is being discussed during a screen sharing session.

Example 17: A computer-readable storage medium includes determine that a message-sending computing device has received an indication of user input indicating an intent to send a message to a user of a message-recipient computing device; prior to the message being delivered to the message-recipient computing device, calculate a screen sharing risk score (SSRS) that indicates a risk that the message-recipient computing device is currently sharing screen content of a screen of the message-recipient computing device with a screen-recipient computing device associated with an untrusted screen-recipient user; determine whether the SSRS indicates that the risk is above a risk threshold; and based on the SSRS indicating that the risk is above the risk threshold, cause the message-sending computing device to output an alert indicating that the message-recipient computing device is possible currently sharing the screen content of the message-recipient computing device with the screen-recipient computing device associated with the untrusted screen-recipient user.

Example 18: The computer-readable storage medium of example 17, wherein the instructions that cause the processing circuitry to determine that the message-sending computing device has received the indication of user input indicating the intent to send the message to the user of the message-recipient computing device comprises instructions that, when executed, cause the processing circuitry to determine, prior to the message-sending computing device receiving an indication of user input to actually send the message to the user of the message-recipient computing device, that the message-sending computing device has received the indication of user input indicating the intent to send the message to the user of the message-recipient computing device.

Example 19: The computer-readable storage medium of example 18, wherein the instructions further comprise instructions that, when executed, cause the processing circuitry to determine categories of screen-recipient users; and wherein the instructions, when executed, cause the processing circuitry to calculate the SSRS based on the categories of the screen-recipient users.

Example 20: The computer-readable storage medium of any of examples 18 and 19, wherein the instructions that cause the processing circuitry to calculate the SSRS comprise instructions that, when executed, cause the processing circuitry to calculate the SSRS as a weighted averages of values of variables in score basis data, wherein the variables in the score basis data include one or more of: a variable indicating whether an individual screen sharing application is installed on the message-sending computing device, a variable indicating whether an individual screen sharing application is in use, a variable indicating whether a full screen of the message-recipient computing device is being shared, a variable indicating how many monitors are connected to the message-recipient computing device, a variable indicating whether a messaging application is configured to receive messages on the message-recipient computing device, a variable indicating whether any screen-recipient user is untrusted for a categories associated with the message, or a variable indicating whether a topic is being discussed during a screen sharing session.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   determining, by one or more processors of a computing system, that a message-sending computing device has received an indication of user input indicating an intent to send a message to a user of a message-recipient computing device; and
   prior to the message being delivered to the message-recipient computing device:
      calculating, by the one or more processors, a screen sharing risk score (SSRS) that indicates a risk that the message-recipient computing device is currently sharing screen content of a screen of the message-recipient computing device with a screen-recipient computing device associated with an untrusted screen-recipient user;
      determining, by the one or more processors, whether the SSRS indicates that the risk is above a risk threshold; and
      based on the SSRS indicating that the risk is above the risk threshold, causing, by the one or more processors, the message-sending computing device to output an alert indicating that the message-recipient computing device is possibly currently sharing the screen content of the message-recipient computing device with the screen-recipient computing device associated with the untrusted screen-recipient user.

2. The method of claim 1, further comprising:
   receiving, by the one or more processors, in response to the alert, a command to hold the message; and
   in response to the command to hold the message:
      delaying, by the one or more processors, forwarding the message for delivery to the message-recipient computing device;
      recalculating, by the one or more processors, the SSRS; and
      determining, by the one or more processors, whether to forward the message for delivery to the message-recipient computing device based on the recalculated SSRS.

3. The method of claim 1, further comprising:
   determining, by the one or more processors, a category associated with content of the message; and
   determining, by the one or more processors, the risk threshold based on the category associated with the content of the message.

4. The method of claim 1,
   wherein the method further comprises receiving, by the one or more processors, data indicating that the user of the message-sending computing device has specified a risk threshold for the user of the message-recipient computing device; and
   wherein determining whether the SSRS indicates that the risk is above the risk threshold comprises determining, by the one or more processors, whether the SSRS indicates that the risk is above the risk threshold for the user of the message-recipient computing device.

5. The method of claim 1, further comprising determining, by the one or more processors, a numerical value based on the SSRS, wherein the alert includes the numerical value.

6. The method of claim 1, wherein determining that the message-sending computing device has received the indication of user input indicating the intent to send the message to the user of the message-recipient computing device comprises determining, by the one or more processors, prior to the message-sending computing device receiving an indication of user input to actually send the message to the user of the message-recipient computing device, that the message-sending computing device has received the indication of user input indicating the intent to send the message to the user of the message-recipient computing device.

7. The method of claim 1,
   wherein the method further comprises determining, by the one or more processors, categories of screen-recipient users; and
   wherein calculating the SSRS comprises calculating, by the one or more processors, the SSRS based on the categories of the screen-recipient users.

8. The method of claim 1, wherein calculating the SSRS comprises calculating the SSRS as a weighted average of values of variables in score basis data, wherein the variables in the score basis data include one or more of:
   a variable indicating whether an individual screen sharing application is installed on the message-sending computing device, a variable indicating whether an individual screen sharing application is in use, a variable indicating whether a full screen of the message-recipient computing device is being shared, a variable indicating how many monitors are connected to the message-recipient computing device, a variable indicating whether a messaging application is configured to receive messages on the message-recipient computing device, a variable indicating whether any screen-recipient user is untrusted for a categories associated with the message, or a variable indicating whether a topic is being discussed during a screen sharing session.

9. A computing system comprising:

one or more storage devices configured to store score basis data; and one or more processors implemented in circuitry, the one or more processors configured to:

determine that a message-sending computing device has received an indication of user input indicating an intent to send a message to a user of a message-recipient computing device;

prior to the message being delivered to the message-recipient computing device, calculate, based on the score basis data, a screen sharing risk score (SSRS) that indicates a risk that the message-recipient computing device is currently sharing screen content of a screen of the message-recipient computing device with a screen-recipient computing device associated with an untrusted screen-recipient user;

determine whether the SSRS indicates that the risk is above a risk threshold; and based on the SSRS indicating that the risk is above the risk threshold, cause the message-sending computing device to output an alert indicating that the message-recipient computing device is possibly currently sharing the screen content of the message-recipient computing device with the screen-recipient computing device associated with the untrusted screen-recipient user.

10. The computing system of claim 9, wherein the one or more processors are configured to:

receive in response to the alert, a command to hold the message; and in response to the command to hold the message:

delay forwarding the message for delivery to the message-recipient computing device;

recalculate the SSRS, and determine whether to forward the message for delivery to the message-recipient computing device based on the recalculated SSRS.

11. The computing system of claim 9, wherein the one or more processors are further configured to:

determine a category associated with content of the message; and determine the risk threshold based on the category associated with the content of the message.

12. The computing system of claim 9, wherein the one or more processors are further configured to receive data indicating that the user of the message-sending computing device has specified a risk threshold for the user of the message-recipient computing device; and wherein the one or more processors are configured to, as part of determining whether the SSRS indicates that the risk is above the risk threshold, determine whether the SSRS indicates that the risk is above the risk threshold for the user of the message-recipient computing device.

13. The computing system of claim 9, wherein the one or more processors are further configured to determine a numerical value based on the SSRS, wherein the alert includes the numerical value.

14. The computing system of claim 9, wherein the one or more processors are configured to, as part of determining that the message-sending computing device has received an indication of user input indicating an intent to send the message to the user of the message-recipient computing device, determine, prior to the message-sending computing device receiving an indication of user input to actually send the message to the user of the message-recipient computing device, that the user of the message-sending computing device has received the indication of user input indicating the intent to send the message to the user of the message-recipient computing device.

15. The computing system of claim 9, wherein the one or more processors are further configured to determine categories of screen-recipient users; and wherein the one or more processors are configured to calculate the SSRS based on the categories of the screen-recipient users.

16. The computing system of claim 9, wherein the one or more processors are configured to calculate the SSRS as a weighted average of values of variables in score basis data, wherein the variables in the score basis data include one or more of:

a variable indicating whether an individual screen sharing application is installed on the message-sending computing device, a variable indicating whether an individual screen sharing application is in use, a variable indicating whether a full screen of the message-recipient computing device is being shared, a variable indicating how many monitors are connected to the message-recipient computing device, a variable indicating whether a messaging application is configured to receive messages on the message-recipient computing device, a variable indicating whether any screen-recipient user is untrusted for a categories associated with the message, or a variable indicating whether a topic is being discussed during a screen sharing session.

17. A non-transitory computer-readable storage medium comprising instructions that, when executed, cause processing circuitry of a computing system to:

determine that a message-sending computing device has received an indication of user input indicating an intent to send a message to a user of a message-recipient computing device;

prior to the message being delivered to the message-recipient computing device, calculate a screen sharing risk score (SSRS) that indicates a risk that the message-recipient computing device is currently sharing screen content of a screen of the message-recipient computing device with a screen-recipient computing device associated with an untrusted screen-recipient user;

determine whether the SSRS indicates that the risk is above a risk threshold; and based on the SSRS indicating that the risk is above the risk threshold, cause the message-sending computing device to output an alert indicating that the message-recipient computing device is possible currently sharing the screen content of the message-recipient computing device with the screen-recipient computing device associated with the untrusted screen-recipient user.

18. The non-transitory computer-readable storage medium of claim 17, wherein the instructions that cause the processing circuitry to determine that the message-sending computing device has received the indication of user input indicating the intent to send the message to the user of the message-recipient computing device comprises instructions that, when executed, cause the processing circuitry to determine, prior to the message-sending computing device receiving an indication of user input to actually send the message to the user of the message-recipient computing device, that the message-sending computing device has received the indication of user input indicating the intent to send the message to the user of the message-recipient computing device.

19. The non-transitory computer-readable storage medium of claim 18,
wherein the instructions further comprise instructions that, when executed, cause the processing circuitry to determine categories of screen-recipient users; and
wherein the instructions, when executed, cause the processing circuitry to calculate the SSRS based on the categories of the screen-recipient users.

20. The non-transitory computer-readable storage medium of claim 18, wherein the instructions that cause the processing circuitry to calculate the SSRS comprise instructions that, when executed, cause the processing circuitry to calculate the SSRS as a weighted average of values of variables in score basis data, wherein the variables in the score basis data include one or more of:
a variable indicating whether an individual screen sharing application is installed on the message-sending computing device,
a variable indicating whether an individual screen sharing application is in use,
a variable indicating whether a full screen of the message-recipient computing device is being shared,
a variable indicating how many monitors are connected to the message-recipient computing device,
a variable indicating whether a messaging application is configured to receive messages on the message-recipient computing device,
a variable indicating whether any screen-recipient user is untrusted for a categories associated with the message, or
a variable indicating whether a topic is being discussed during a screen sharing session.

\* \* \* \* \*